United States Patent
Lin et al.

(10) Patent No.: US 11,116,059 B2
(45) Date of Patent: Sep. 7, 2021

(54) PROXIMITY SENSOR OPERATING METHOD AND PROXIMITY SENSOR APPLYING THE METHOD

(71) Applicant: SensorTek technology Corp., Hsinchu County (TW)

(72) Inventors: Meng-Yong Lin, Hsinchu County (TW); Ming-Huang Liu, Hsinchu County (TW)

(73) Assignee: SensorTek technology Corp., Hsinchu County (TW)

( * ) Notice: Subject to any disclaimer, the term of this patent is extended or adjusted under 35 U.S.C. 154(b) by 0 days.

(21) Appl. No.: 16/862,577

(22) Filed: Apr. 30, 2020

(65) Prior Publication Data

US 2020/0367342 A1 Nov. 19, 2020

Related U.S. Application Data

(60) Provisional application No. 62/840,423, filed on Apr. 30, 2019.

(51) Int. Cl.
*H05B 47/10* (2020.01)
*H05B 47/115* (2020.01)
*H05B 47/17* (2020.01)

(52) U.S. Cl.
CPC ........... *H05B 47/115* (2020.01); *H05B 47/17* (2020.01)

(58) Field of Classification Search
CPC .... H05B 47/10; H05B 47/105; H05B 47/115; H05B 47/17
See application file for complete search history.

(56) References Cited

U.S. PATENT DOCUMENTS

| | | | | |
|---|---|---|---|---|
| 2011/0227486 A1* | 9/2011 | Harada | | F21K 9/00 315/158 |
| 2012/0043910 A1* | 2/2012 | Nagashima | | H05K 1/189 315/294 |
| 2012/0161654 A1* | 6/2012 | Ohtake | | H02M 3/33507 315/200 R |
| 2013/0293114 A1* | 11/2013 | Tipirneni | | H05B 45/20 315/151 |
| 2014/0005851 A1 | 1/2014 | Frei | | |

(Continued)

FOREIGN PATENT DOCUMENTS

| | | |
|---|---|---|
| CN | 107257415 A | 10/2017 |
| TW | 201033725 A1 | 9/2010 |
| TW | 201814323 A | 4/2018 |

*Primary Examiner* — Tung X Le
(74) *Attorney, Agent, or Firm* — Winston Hsu

(57) ABSTRACT

Disclosed is a proximity sensor operating method used in a proximity sensor comprising a light-emitting device. The method comprises: in a standby mode, when an output of the proximity sensor is a first sensing state, driving a driving current of the light-emitting device to comprise a first driving current; when the proximity sensor is triggered, a check mode is entered, the proximity sensor still outputs the first sensing state, and the driving current is switched to comprise a second driving current larger than the first driving current; and in the check mode, when the length of time/number of times of triggering the proximity sensor is larger than or equal to a threshold length/number, the output of the proximity sensor switches to the second sensing state, and returning to the standby mode in which the driving current comprises the first driving current.

18 Claims, 7 Drawing Sheets

(56) References Cited

U.S. PATENT DOCUMENTS

| | | | |
|---|---|---|---|
| 2014/0268628 A1* | 9/2014 | Mann | G08C 17/02 362/23.1 |
| 2015/0216016 A1* | 7/2015 | Reed | H05B 47/11 315/159 |
| 2015/0378013 A1 | 12/2015 | Bikumandla | |
| 2016/0374177 A1* | 12/2016 | Chen | H05B 45/20 |
| 2018/0116039 A1* | 4/2018 | Harte | H05B 47/19 |

* cited by examiner

PROXIMITY SENSOR OPERATING METHOD AND PROXIMITY SENSOR APPLYING THE METHOD

CROSS REFERENCE TO RELATED APPLICATION

This application claims the benefit of U.S. Provisional Application No. 62/840,423, filed on 2019 Apr. 30, the contents of which are incorporated herein by reference.

BACKGROUND OF THE INVENTION

1. Field of the Invention

The present invention relates to a proximity sensor operating method and a proximity sensor using the method, and particularly relates to a proximity sensor operating method and a proximity sensor using the method which can reduce the probability of misjudgment and the power consumption.

2. Description of the Prior Art

A conventional proximity sensor usually comprises an optical sensor and a light-emitting device. The optical sensor can generate an optical sensing signal according to received light (i.e., light received by the optical sensor), and determines whether an object is close according to a value of the optical sensing signal. For example, when an object is close, more light emitted by the light-emitting device is reflected by the object, such that the optical sensor can receive more reflected light and generate a stronger optical sensing signal. Thereby the proximity sensor can determine the object is close and output a "near state". When the object is far away, less light emitted by the light-emitting device is reflected by the object. Therefore, the optical sensor receives less reflected light and generates a weaker optical sensing signal, so that the proximity sensor determines that the object is far away and outputs a "far state".

The light-emitting device of the conventional proximity sensor is usually driven by a fixed driving current to emit stable light for sensing. However, a continuous supply of driving currents to the light-emitting device may cause problems with power consumption. Especially when the resolution requirement of the proximity sensor is increased, or when the opening of a cover for hiding the proximity sensor is hidden thus is not easy for the light to penetrate. In such cases, a larger current is needed to drive the light-emitting device, which will cause the proximity sensor to have considerable power consumption. In addition, the value of the optical sensing signal may fluctuate due to interference, which may affect the accuracy of the proximity sensor's determination. For example, the optical sensor may receive unstable ambient light (such as a flickering light source), or be affected by the brightness of the object surface (such as black or white hair), which may cause abnormal fluctuations in the optical sensing signal, resulting in the misjudgment of the proximity sensor for the condition of the object. If the proximity sensor outputs the misjudged result to the electronic device, it may greatly affect the user experience.

Therefore, a novel proximity sensor operating method is needed to solve the above-mentioned problems.

SUMMARY OF THE INVENTION

Therefore, one objective of the present invention is to provide a proximity sensor operating method which can change the driving currents to avoid misjudgment, to increase the determination accuracy and to reduce power consumption.

A proximity sensor operating method applied for a proximity sensor comprising a light-emitting device is provided according to one embodiment of the present invention. The proximity sensor operating method comprises a standby mode and a check mode, wherein: in the standby mode, when an output of the proximity sensor is a first sensing state, driving a driving current of the light-emitting device to comprise a first driving current; when the proximity sensor is triggered, a check mode is entered, the proximity sensor still outputs the first sensing state and switches the driving current to comprise a second driving current larger than the first driving current; and in the check mode, when a length of time/number of times of triggering the proximity sensor is larger than or equal to a threshold length/number, the output of the proximity sensor switches from the first sensing state to the second sensing state, and returns to the standby mode such that the driving current comprises the first driving current.

In view of the above-mentioned embodiments of the present invention, it is possible for the proximity sensor to perform a precision mode check before switching the output sensing state, so as to reduce the probability of incorrectly switching the output sensing state due to interference. In addition, the proximity sensor can selectively use different drive currents in various modes to reduce the power consumption of the proximity sensor or make the proximity sensing of the proximity sensor more accurate. Also, by setting different trigger determination standards, the accuracy of the proximity sensor can be further increased.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. Each component in following descriptions can be implemented by hardware (e.g., a device or a circuit) or hardware with software (e.g., a program installed to a processor). Besides, the term "first", "second", "third" in following descriptions are only for the purpose of distinguishing different one elements, and do not mean the sequence of the elements. For example, a first device and a second device only mean these devices can have the same structure but are different devices.

Figure 1:
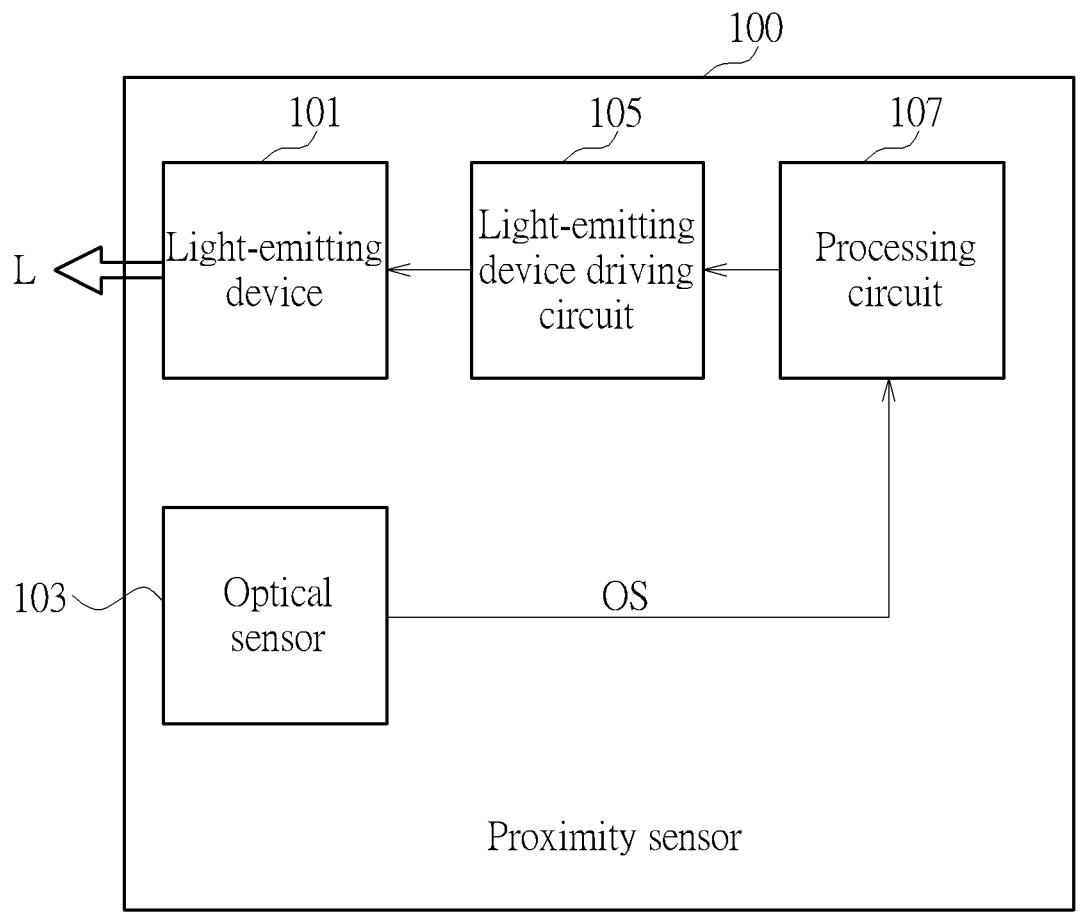
FIG. 1 is a block diagram illustrating a proximity sensor according to one embodiment of the present invention.

FIG. 1 is a block diagram illustrating a proximity sensor according to one embodiment of the present invention. Please note the proximity sensor 100 shown in FIG. 1 is only used to illustrate the embodiment of the present invention. Any proximity sensor that can be used to implement the embodiment of the present invention to achieve the same function should fall in the scope of the present invention. As shown in FIG. 1, the proximity sensor 100 comprises a light-emitting device 101, an optical sensor 103, a light-emitting device driving circuit 105, and a processing circuit 107. The light-emitting device 101 may be a light-emitting diode for emitting light L. The light L may be invisible light such as infrared ray. The optical sensor 103 may be a photodiode configured to receive light to generate an optical sensing signal OS. The light-emitting device driving circuit 105 is configured to provide a driving current I to the light-emitting device 105, and the processing circuit 107 is configured to determine whether the object is far away (that is, the object is far away from the proximity sensor 100) or close (that is, the object is closer to the proximity sensor 100) according to the optical sensing signal OS output by the optical sensor 103, and the driving current I provided by the light-emitting device driving circuit 105 is controlled accordingly.

In the following embodiments, when the processing circuit 107 determines that the object is far away, the proximity sensor 100 outputs the far state, and when the processing circuit 107 determines that the object is close, the proximity sensor 100 outputs the near state. The far state and the near state output by the proximity sensor 100 can be used to control the actions of other electronic devices. For example, if the proximity sensor 100 is installed in a mobile electronic device (e.g., a mobile phone), when the proximity sensor 100 outputs a far state (e.g., no object is close to the mobile electronic device), the screen of the mobile electronic device remains turning on, such that users can perform various operations on mobile electronic devices. When the proximity sensor 100 outputs the near state (e.g., the mobile electronic device is close to the user), the screen of the mobile electronic device is turned off, so that the user will not accidentally touch the screen of the mobile electronic device when using the call function. Moreover, the proximity sensor 100 provided by the present invention is not limited to be used in the operation of turning the screen on or off.

Figure 2:
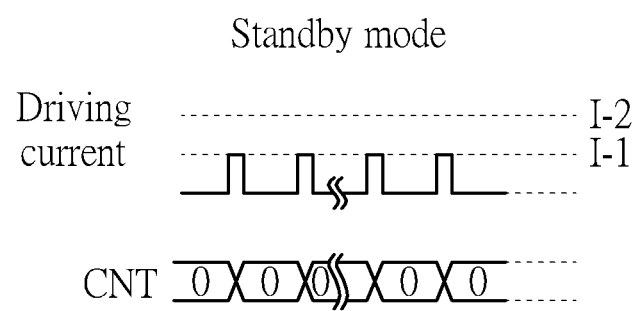
FIG. 2 and FIG. 3 are schematic diagrams illustrating a proximity sensor operating method according to one embodiment of the present invention.
Figure 3:
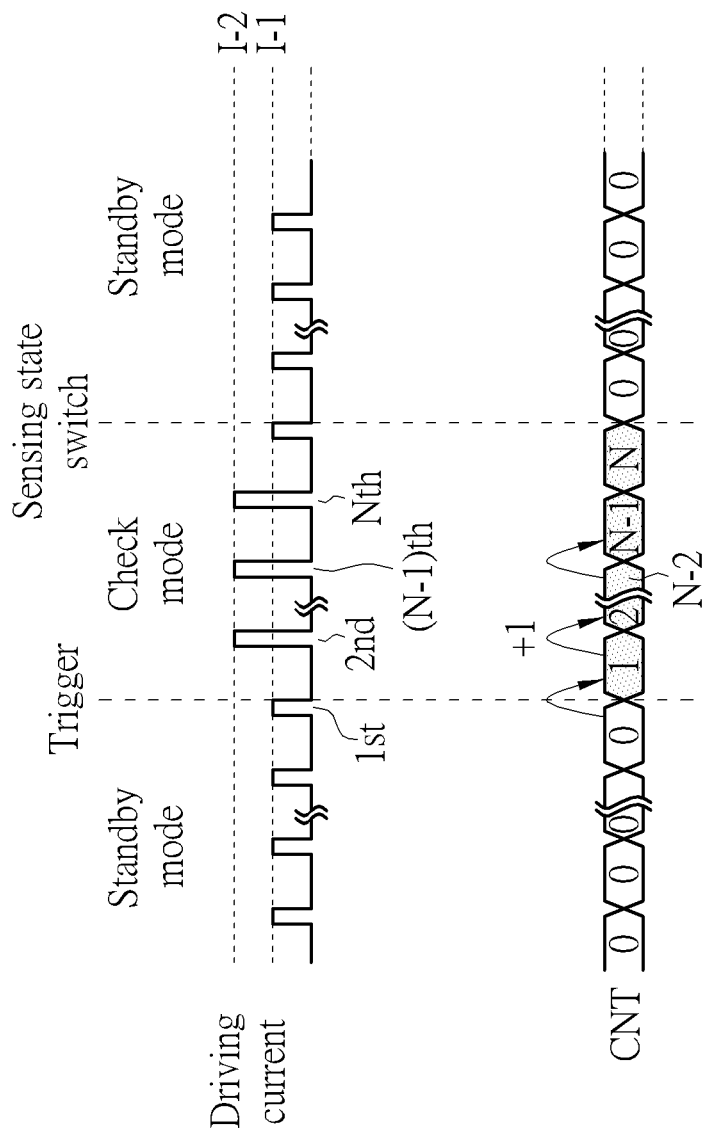

In the following descriptions, a plurality of embodiments are used to illustrate the proximity sensor operating method provided by the present invention. FIG. 2 and FIG. 3 are schematic diagrams illustrating a proximity sensor operating method according to one embodiment of the present invention. In FIG. 2, the proximity sensor 100 operates in a standby mode, and the driving current of the light-emitting device 101 is driven by a first driving current I_1. In such case, the proximity sensor 100 may output a near state or a far state. In FIG. 3, if the proximity sensor 100 is triggered from the standby mode to switch to another sensing state but not yet switched (hereinafter referred to as "triggered" in the description), it will first enter a check mode. In the check mode, the driving current of the light-emitting device 101 is driven by a larger second driving current I_2, which is larger than the first driving current I_1. If the proximity sensor 100 is continuously triggered, a check count CNT is continuously accumulated. In the check mode, if the length of time/number of times of triggering the proximity sensor 100 is equal to or larger than the threshold length/number (that is, the cumulative value of the check count CNT exceeds or equals a threshold count N), then switch to another sensing state and then return to the standby mode.

In the embodiment shown in FIG. 3, the threshold count N is a threshold number, and N is a positive integer. That is, if the proximity sensor 100 is triggered in the standby mode, the processing circuit 107 accumulates the check count CNT once, enters the check mode, and controls the light-emitting device driving circuit 105 to use the second driving current I_2 to drive the light-emitting device 101. In the check mode, each time the proximity sensor 100 is triggered, the processing circuit 107 accumulates the check count CNT once. The proximity sensor 100 switches the sensing state when the check count CNT reaches the threshold count N, and the check count CNT is reset to zero to return to the standby mode to drive the light-emitting device 101 with the first driving current I_1. On the contrary, if the proximity sensor 100 is no longer triggered before the check count CNT reaches the threshold count N, the proximity sensor 100 does not switch the sensing state, and the processing circuit 107 still resets the check count CNT to zero to return to the standby mode to drive the light-emitting device 101 with the first driving current I_1.

Figure 4:
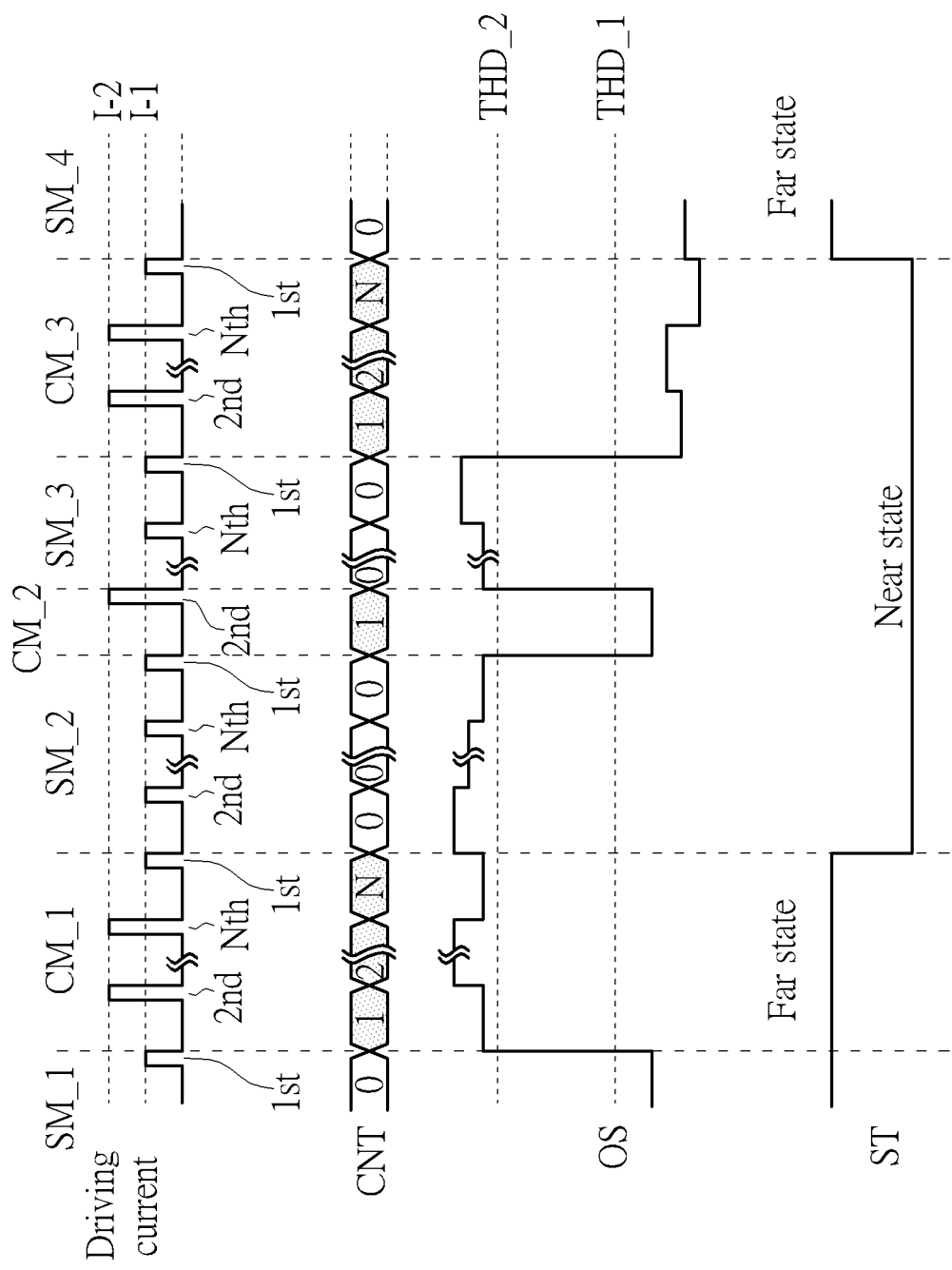
FIG. 4 is a detailed schematic diagram illustrating operations of the embodiment provided by the present invention.

FIG. 4 is a detailed schematic diagram illustrating operations of the embodiment provided by the present invention. In the embodiment shown in FIG. 4, if the proximity sensor 100 is in the standby mode and the output sensing state ST is the near state, when the value of the optical sensing signal OS is smaller than a first sensing threshold THD_1, the proximity sensor 100 is triggered and enters the aforementioned check mode to prepare to switch to the far state. On the contrary, if the proximity sensor 100 is in the standby mode and outputs the far state, when the value of the optical sensing signal OS is larger than a second sensing threshold THD_2, the proximity sensor 100 is triggered and enters the aforementioned check mode to prepare to switch to the near state. In one embodiment, the first sensing threshold THD_1 is smaller than or equal to the second sensing threshold THD_2.

For more detail, please refer to FIG. 4, it is supposed that the proximity sensor 100 initially operates in a standby mode SM_1 and the output state is the far state. In such case, since there is no object close the proximity sensor 100, few light L emitted from the light-emitting device 101 is reflected, so the light intensity received by the optical sensor 103 is small and a weaker optical sensing signal OS is generated. If the light intensity received by the optical sensor 103 changes to make the optical sensing signal OS is larger than the second sensing threshold THD_2, the proximity sensor 100 is triggered and enters the check mode CM_1. In the check mode CM_1, the light-emitting device driving circuit 105 uses a larger second driving current I_2 to drive the light-emitting device 101. Since the optical sensing signal OS is continuously larger than the second sensing threshold THD_2, the proximity sensor 100 is continuously triggered and the check count CNT continuously accumulates. If the length of time/number of times of triggering the proximity sensor 100 is equal to or larger than the threshold length/number (i.e., the cumulative value of the check count CNT reaches the threshold count N), the proximity sensor 100 is switched to output the near state and switched to the standby mode SM_2. In the standby mode SM_2, the light-emitting device 101 is still driven by the smaller first driving current I_1.

In the standby mode SM_2, the output state is the near state. In such case, since the object is close to the sensor 100, more light L emitted by the light-emitting device 101 is reflected, so the light intensity received by the optical sensor 103 is larger and a stronger optical sensing signal OS is generated. If the light intensity received by the optical sensor 103 changes to make the optical sensing signal OS is smaller than the first sensing threshold THD_1, the proximity sensor 100 is triggered and enters the check mode CM_2. In the check mode CM_2, the light-emitting device driving circuit 105 also uses a larger second driving current I_2 to drive the light-emitting device 101. However, since the optical sensing signal OS has changed to no longer smaller than the first sensing threshold THD_1 before the length of time/number of times of triggering the proximity sensor 100 is equal to or larger than the threshold length/number (i.e., before the cumulative value of the check count CNT reaches the threshold count N), that is, the proximity sensor 100 is no longer triggered. In such case, the output of the proximity sensor 100 is maintained in the near state, and the check count CNT is reset to zero and returns to the standby mode SM_3, so that the driving current is the first driving current I_1.

In the standby mode SM_3, the proximity sensor 100 outputs the near state, so when the optical sensing signal OS is smaller than the first sensing threshold THD_1 again, the proximity sensor 100 is triggered and enters the check mode CM_3. In the check mode CM_3, since the optical sensing signal OS is continuously smaller than the first sensing threshold THD_1, the proximity sensor 100 is continuously triggered and the check count CNT is also continuously accumulated. In the check mode CM_3, the length of time/number of times of triggering the proximity sensor 100 is equal to or larger than the threshold length/number (that is, the cumulative value of the check count CNT reaches the threshold count N), so the proximity sensor 100 is switched to output the far state and switched to the standby mode SM_4. In the standby mode SM_4, the light-emitting device 101 is still driven by the smaller first driving current I_1.

In one embodiment of the present invention, the proximity sensor 100 uses different gain values to process the optical sensing signal OS under different driving currents, thereby generating a sensing result of the same or similar sensitivity (Proximity Sensitivity). For example, when the driving current is the first driving current I_1, the proximity sensor 100 uses the first gain value to process the optical sensing signal OS, and when the driving current is the second driving current I_2, the proximity sensor 100 uses the second gain value to process the optical sensing signal OS. The first gain value is larger than the second gain value. Accordingly, although the second driving current I_2 is larger than the first driving current I_1, the first gain value is set to be larger than the second gain value, such that the optical sensing signal OS under different driving currents is processed by different gain values thereby the same or similar sensing results can still be got For more detail, in such type of embodiment, the optical sensing signal OS generated by the optical sensor 103 is first processed by gain processing, and then the processing circuit 107 in FIG. 1 performs the following determination. Therefore, after the gain processing of the optical sensing signal OS corresponding to different driving currents, the difference of sensitivity (i.e., the proximity sensitivity) should fall within a predetermined range or the sensitivity should be the same, to avoid affecting the determination of the processing circuit 107. Wherein the proximity sensor 100 can process the optical sensing signal OS under different driving currents with different gain values through various implementations. For example, the gain values of the optical sensing signal OS can be designed by using an amplifier circuit built in the optical sensor 103 or the processing circuit 107. Further, an additional sensitivity equalization circuit can be set to process the optical sensing signal OS with different gain values. Even several optical sensors 103 with different specifications can be configured to operate under different driving currents, and then the optical sensing signals OS with different gains are generated.

Figure 5:
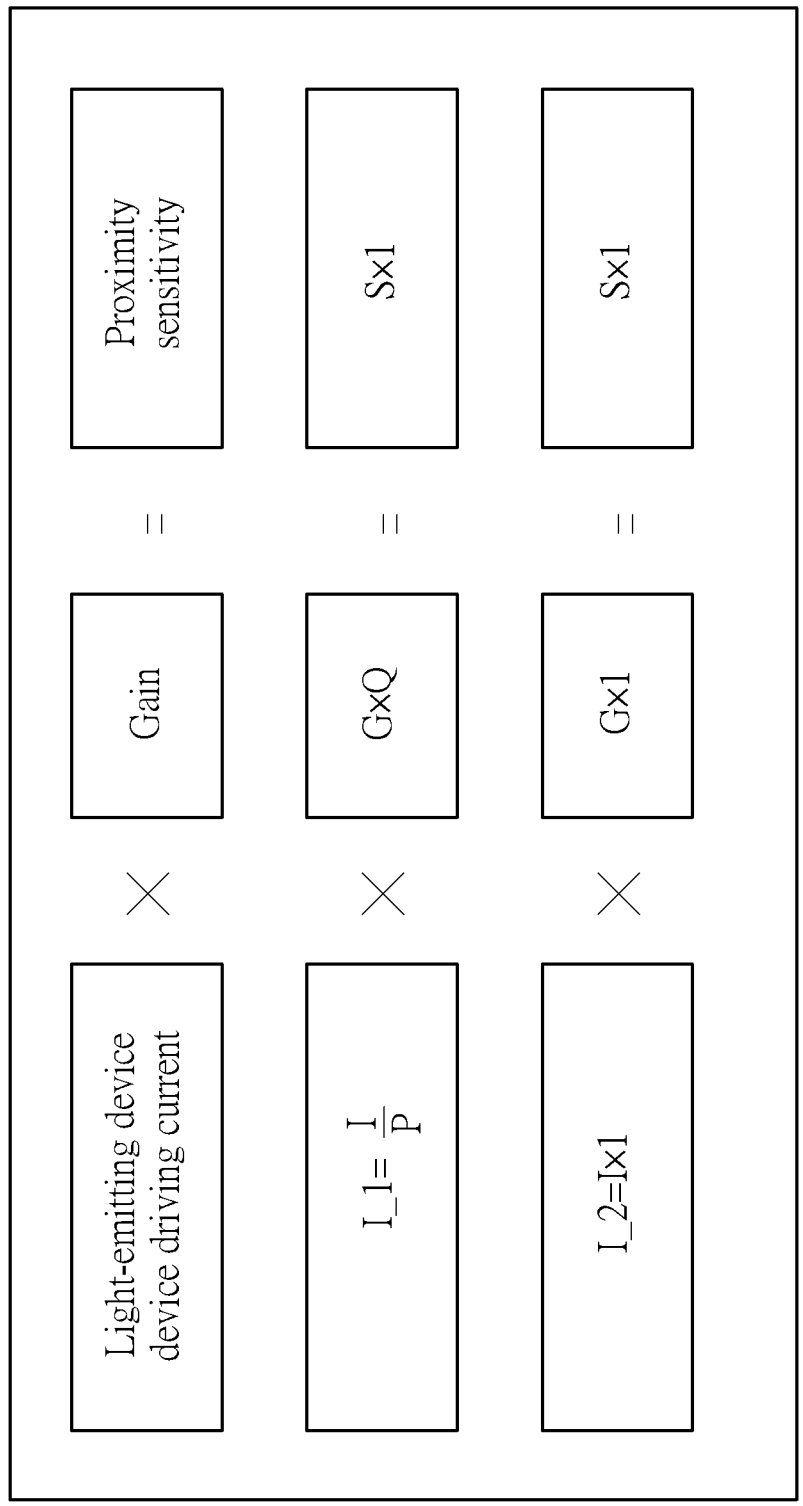
FIG. 5 is a schematic diagram illustrating that different gains are used for different driving currents.

As shown in FIG. 5, in one embodiment, the second driving current I_2 is P times the first driving current I_1, the first gain value is Q times the second gain value, and both P and Q are larger than 1. By selecting appropriate P and Q, the optical sensing signals OS corresponding to different driving currents can have a signal intensity difference within a predetermined range after gain processing. For example, if the intensity of the light L emitted by the light-emitting device 101 is proportional to the driving current, the intensity of the optical sensing signal OS without gain processing is also proportional to the driving current when the proximity sensor 100 is used for sensing under the same conditions. Therefore, by designing P=Q as above-mentioned, the proximity sensor 100 can produce a sensing result with the same sensitivity under different driving currents. By this way, the proximity sensor 100 can still have the same or similar sensitivity even when the driving currents of the light-emitting device 101 are different.

In view of the proximity sensor operation method illustrated in the above-mentioned embodiments of the present invention, the present invention has many advantages that the prior art cannot achieve. Details are illustrated below. In the above-mentioned embodiments, the smaller driving current I_1 is used in the standby mode to drive the light-emitting device 101. When the proximity sensor 100 is triggered to enter the check mode, the second driving current I_2 is used to drive the light-emitting device 101, which is fixed in the prior art. The fixed driving current causes problems with power consumption. The application of the above-mentioned embodiments of the present invention can produce good power-saving effects, especially when the proximity sensor 100 is installed in a system that is not easy to frequently change the sensing state such as a mobile electronic device. The proximity sensor 100 is in a standby state most of the time, so that the power-saving effect of the embodiment of the present invention is particularly significant. Furthermore, although the present invention uses different driving currents to drive the light-emitting device 101, the above-mentioned embodiment can use a larger second driving current I_2 when it is needed to check whether the sensing state of the proximity sensor 100 should be switched in the check mode, to effectively prevent noise from affecting the sensing result of the proximity sensor 100. In addition, the above-mentioned embodiments of the present invention not only reduces the influence of noise by using a large driving current in the check mode, but also switches the sensing state of the proximity sensor 100 when the check count CNT reaches the threshold count N. By this way, when the optical sensing signal OS fluctuates abnormally, it can effectively prevent the proximity sensor 100 from misjudging the sensing state of the object, so as to further improve the accuracy of the determination of the proximity sensor 100.

Figure 6:
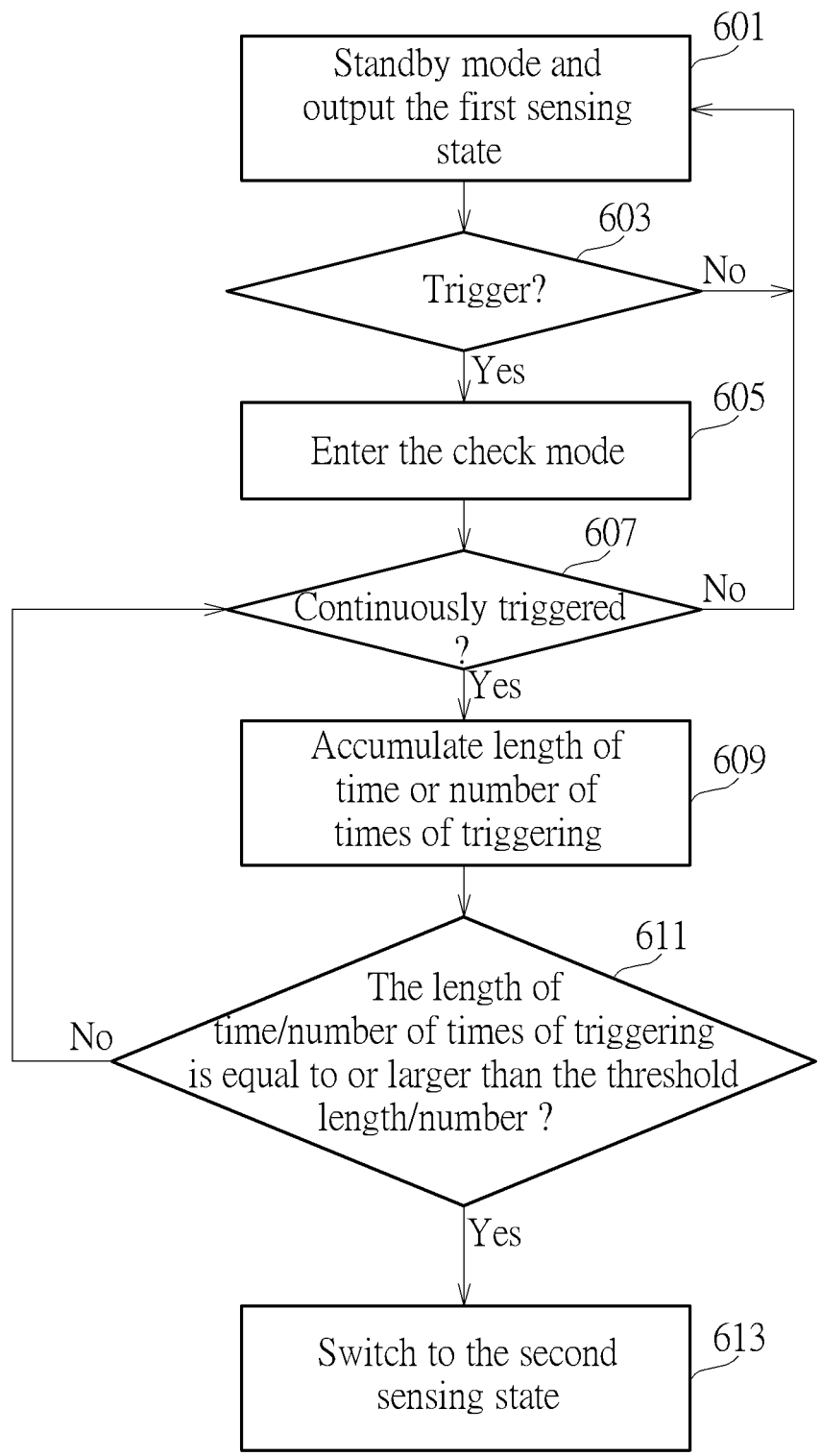
FIG. 6 is a flow chart illustrating a proximity sensor operating method according to one embodiment of the present invention.

FIG. 6 is a flow chart illustrating a proximity sensor operating method according to one embodiment of the present invention, which may correspond to the embodiment shown in FIG. 4. In the flowchart of FIG. 6, when the first sensing state is the far state, the second sensing state is the near state. Also, when the first sensing state is the near state, the second sensing state is the far state. However, please note that the flowchart in FIG. 6 is only for example, and the steps and sequence thereof are not intended to limit the scope of the present invention.

The flowchart shown in FIG. 6 comprises the following steps:

Step 601

The proximity sensor 100 operates in the standby mode and outputs the first sensing state, for example, operates in the standby modes SM_1, SM_2, SM_3 in FIG. 4.

Step 603

Determine whether the proximity sensor 100 is triggered. If yes, go to step 605 to enter the check mode, for example, operate in the check modes CM_1, CM_2, and CM_3 in FIG. 4. If not, return to step 601 to maintain in the standby mode.

Step 605

Enter the check mode.

As mentioned above, if the proximity sensor 100 outputs a near state, when the value of the optical sensing signal OS in FIG. 4 is smaller than the first sensing threshold THD_1, the proximity sensor 100 is triggered to enter the check mode of the step 605. Oppositely, if the proximity sensor 100 outputs a far state, when the value of the optical sensing signal OS is larger than the second sensing threshold THD_2, the proximity sensor 100 is triggered to enter the check mode of step 605.

Step 607

In the check mode, it is determined whether the proximity sensor 100 is continuously triggered. If yes, go to step 609, if not, go back to step 601 to reset the check count CNT to zero to return to the standby mode.

Step 609

Accumulate length of time or number of times of triggering. For example, in the check modes CM_1 and CM_3 in FIG. 4, the proximity sensor 100 is continuously triggered, and therefore the check count CNT is continuously accumulated.

Step 611

Determining whether the length of time/number of times of triggering is equal to or larger than the threshold length/number (e.g., determining whether the cumulative value of the check count CNT reaches the threshold count N). If yes, go to step 613, if not, go back to step 607.

Step 613

The output of the proximity sensor 100 is switched to the second sensing state.

For example, in the check mode CM_1 in FIG. 4, the check count CNT is accumulated to reach the threshold count N, so the output of the proximity sensor is switched from the first sensing state (far state) to the second sensing state (near state). In the check mode CM_2 in FIG. 4, since the proximity sensor is no longer triggered before the check count CNT is accumulated to reach the threshold count N, the sensing state is not switched and returns to the standby state SM_3.

Please refer to FIG. 4 again, in the embodiment of FIG. 4, different first sensing threshold THD_1 and second sensing threshold THD_2 are used as the trigger determination standards of the proximity sensor. However, in other embodiments, other types of sensing thresholds can also be used as the trigger determination standard for the proximity sensor. For example, switching from the far state to the near state and from the near state to the far state can use the same sensing threshold as the trigger determination standard of the proximity sensor. When the different first sensing threshold THD_1 and the second sensing threshold THD_2 are used as the trigger determination standard, the probability of misjudging of the proximity sensor can be reduced. For example, when triggering/non-triggering alternately occurs in several consecutive determination cycles, if the trigger determination standards are different, the probability of the proximity sensor being misjudged can be reduced. If the same sensing thresholds are used as the trigger determination standards, the calculation of the proximity sensor can be simplified, the circuit complexity can be reduced, and the processing speed can be increased.

In addition, different sensing thresholds may be used respectively when the light-emitting device 101 is driven with a smaller first drive current I_1 and the light-emitting device 101 is driven with a larger second drive current. For example, when the driving current is the first driving current I_1, a first sensing threshold is used as the trigger determination standard for the proximity sensor to switch from outputting the near state to outputting the far state, and a second sensing threshold is used as a trigger determination standard for the proximity sensor to switch from outputting the far state to outputting the near state. When the driving current is the second driving current I_2, a third sensing threshold is used as a trigger determination standard for the proximity sensor to switch from outputting the near state to outputting the far state, and a fourth sensing threshold is used as the trigger determination standard for the proximity sensor to switch from outputting the far state to outputting the near state.

In one embodiment, the first sensing threshold is smaller than or equal to the second sensing threshold, and the third sensing threshold is smaller than or equal to the fourth sensing threshold. If the first sensing threshold value and the third sensing threshold value are smaller than the second sensing threshold value and the fourth sensing threshold value, respectively, the probability of misjudging of the proximity sensor can be reduced. For example, when triggering/non-triggering alternately occurs in several consecutive determination cycles, if the trigger determination standards are different, the probability of the proximity sensor being misjudged can be reduced. If the first sensing threshold value and the third sensing threshold value are respectively equal to the second sensing threshold value and the fourth sensing threshold value, the calculation of the proximity sensor can be simplified, the circuit complexity is reduced, and the processing speed is increased. In some embodiments of the present invention, it is also possible to design the first sensing threshold to be equal to the second sensing threshold, so as to increase the trigger sensitivity when the driving current is the smaller first driving current I_1. Also, the third sensing threshold value can be smaller than the fourth sensing threshold value, so as to reduce the probability of the proximity sensor being misjudged when the driving current is the larger second driving current I_2.

In another embodiment, the first sensing threshold is larger than or equal to the third sensing threshold, and the second sensing threshold is smaller than or equal to the fourth sensing threshold. When the driving current is the smaller first driving current I_1, since a larger gain may be used to process the optical sensing signal, the sensing result is more easily to be affected by noise, so lenient conditions can be set to determine the trigger. In other words, when the driving current is the smaller first driving current I_1, the first sensing threshold larger than the third sensing threshold is used as the trigger determination standard for switching the proximity sensor from outputting the near state to outputting the far state, and the second threshold value smaller than the fourth threshold value as the trigger determination standard for switching the proximity sensor 100 from outputting the far state to outputting the near state, thereby the proximity sensor 100 to be triggered more easily. In some embodiments of the present invention, the relationship between the first sensing threshold, the second sensing threshold, the third sensing threshold, and the fourth sensing threshold is:

the third critical value< the first sensing threshold=the second sensing threshold< the fourth sensing threshold.

Moreover, the first sensing threshold and the second sensing threshold may be equal to or close to the average of the third sensing threshold and the fourth sensing threshold.

In the above-mentioned embodiments, the driving current is the smaller first driving current I_1 in the standby mode, and the larger second driving current I_2 is used in the check mode. However, the proximity sensor operating method provided by the present invention is not limited to such a mechanism. Both the standby mode and the check mode can comprise different combinations of drive currents. In the following descriptions, since the power consumption is low when the driving current is the first driving current I_1, so it is called the low power consumption mode for the convenience of description. Besides, since the signal-to-noise ratio is high, the proximity sensing is more precise when the driving current is the second driving current I_2, it is called the precision mode for the convenience of description.

Figure 7:
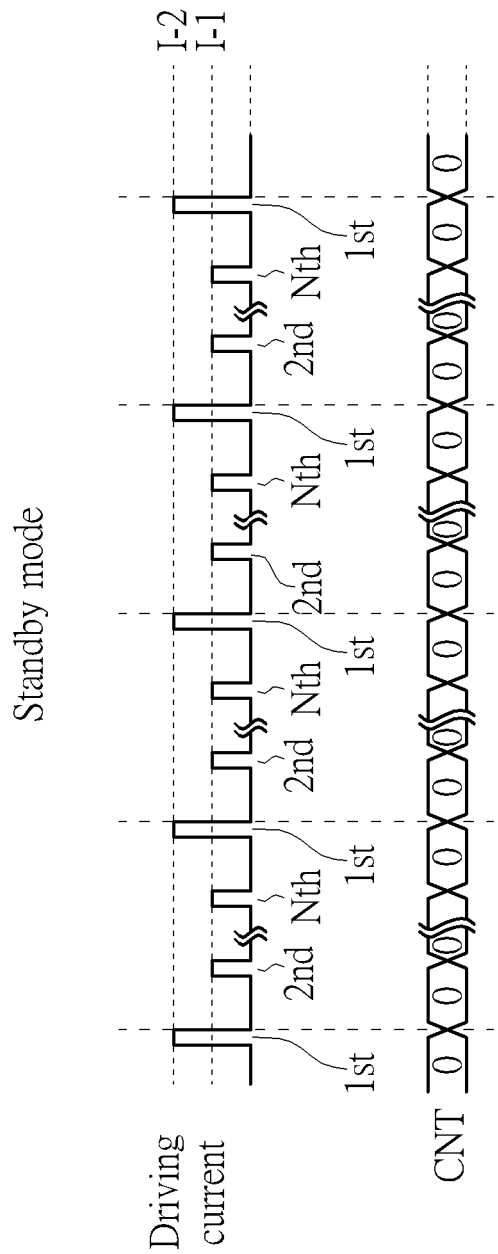
FIG. 7 and FIG. 8 are schematic diagrams illustrating a proximity sensor operating method according to another embodiment of the present invention.
Figure 8:
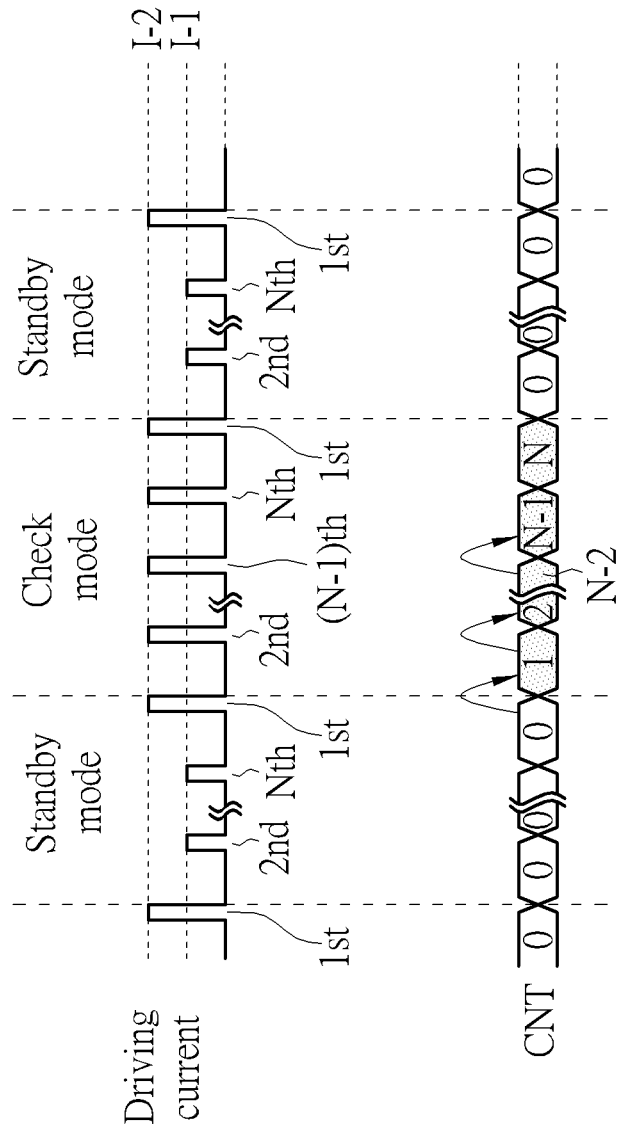

FIG. 7 and FIG. 8 are schematic diagrams illustrating a proximity sensor operating method according to another embodiment of the present invention. In the embodiment of FIG. 7, in the standby mode, the proximity sensor 100 may comprise the precision mode and the low power consumption mode rather than limited to operate in the low power consumption mode, and the driving current is periodically the driving current in the precision mode. For example, in the standby mode, the driving current can be the second driving current I_2 (i.e., the precision mode) once every 0.05~5 seconds. For another example, if the precision mode is once every 1 second, and the proximity sensor 100 performs 30 sensing operations in 1 second in the standby mode, one sensing operation can be the precision mode and the other 29 sensing operations are the low power consumption modes. As mentioned above, in the low power consumption mode, the proximity sensor consumes less power but is easily to be affected by noise. Therefore, in the standby mode, the proximity sensor periodically switches to a more accurate precision mode for proximity sensing. Compared to only using the low power consumption mode, it can effectively improve the trigger sensitivity. In FIG. 8, after the proximity sensor 100 is triggered to enter the check mode, the proximity sensor 100 can be switched to operate in the precision mode.

Please also note, in the standby mode, the proximity sensor is not limited to periodically operate in the precision mode, and it can be configured to comprise the low power consumption mode and the precision mode (i.e., operate in the precision mode non-periodically). For example, the frequency of inserting the precision mode can be reduced corresponding to time of the standby mode, to further reduce power consumption. In one embodiment, no matter whether the proximity sensor operates in the low power mode or the precision mode, the optical sensing signal OS is used as a reference for switching the sensing state, that is, the reference for the triggering of the proximity sensor 100. However, in another embodiment, the optical sensing signal OS is used as a reference for switching the sensing state only in the precision mode. That is, in the standby mode, the proximity sensor 100 can only be triggered in the precision mode, and the proximity sensor 100 is not triggered in the low power consumption mode. The aforementioned example which has one precision mode sensing operation and 29 low power mode sensing operations within 1 second is used as an example for further explaining. In one embodiment, the optical sensing signals OS obtained in 30 sensing operations are used as references for switching the sensing state, which means the proximity sensor 100 may be triggered by the optical sensing signals OS obtained in 30 sensing operations. However, in another embodiment, only the optical sensing signal OS obtained in the precision mode can trigger the proximity sensor 100, and the optical sensing signals OS obtained when the other 29 driving currents are in the low power consumption mode are not used as the references for triggering the proximity sensor 100.

The method of using only the optical sensing signal OS obtained in the precision mode to trigger the proximity sensor 100 can improve the accuracy of proximity sensing. For example, in the far state, the optical sensor 103 may receive more types of noise, and the amount of noise may be more. Therefore, in the standby mode, it can be determined whether to enter the check state only in the precision mode, to further reduce power consumption. Oppositely, since the optical sensor 103 receives fewer types of noise in the proximity state, and the amount of noise may also be less, both the precision mode and the low power consumption mode can be used to determine whether to enter the check state.

In the above-mentioned embodiments, the proximity sensor 100 may comprise a precision mode and a low power consumption mode in the standby mode rather than limited to comprise only the low power consumption mode. Similarly, in the above-mentioned embodiments, the proximity sensor 100 may also comprise a precision mode and a low power consumption mode in the check mode rather than limited to comprise only the precision mode, to further reduce power consumption. For example, in the check mode CM_1 in FIG. 4, if the threshold count N of the check count CNT is 7, the check mode requires 6 sensing operations to determine whether to switch the sensing state in addition to the first sensing operation which set the check count CNT to 1. In such case, the proximity sensor 100 can alternately operate in a precision mode and a low power consumption mode. For example, 6 sensing operations can be performed through a combination of the following modes:

Precision mode, low power consumption mode, precision mode, low power consumption mode, precision mode, and low power consumption mode.

Or

Precision mode, low power consumption mode, precision mode, precision mode, low power consumption mode, precision mode.

However, there are other alternate arrangements for the precision mode and the low power consumption mode, and the present invention is not limited to these examples.

In view of the above-mentioned embodiments of the present invention, it is possible for the proximity sensor to perform a precision mode check before switching the output sensing state, so as to reduce the probability of incorrectly switching the output sensing state due to interference. In addition, the proximity sensor can selectively use different drive currents in various modes to reduce the power consumption of the proximity sensor or make the proximity sensing of the proximity sensor more accurate. Also, by setting different trigger determination standards, the accuracy of the proximity sensor can be further increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A proximity sensor operating method, applied for a proximity sensor comprising a light-emitting device and a processing circuit, the proximity sensor operating method comprising a standby mode and a check mode, wherein:
   when the proximity sensor is in the standby mode and an output of the proximity sensor is a first sensing state, the processing circuit drives a driving current of the light-emitting device to comprise a first driving current;
   when the proximity sensor is triggered, the proximity sensor enters the check mode and still outputs the first sensing state, and the processing circuit switches the driving current to comprise a second driving current larger than the first driving current; and
   when the proximity sensor is in the check mode, and a length of time or number of times of triggering the proximity sensor is larger than or equal to a threshold length or number, the output of the proximity sensor switches from the first sensing state to the second sensing state, and the proximity sensor returns to the standby mode such that the processing circuit drives the driving current to comprise the first driving current.

2. The proximity sensor operating method of claim 1, wherein:
   the proximity sensor further comprises an optical sensor configured to generate an optical sensing signal according to received light, and the proximity sensor uses a first gain value or a second gain value to process the optical sensing signal to generate a sensing result; and
   the first gain value is larger than the second gain value, when the driving current is the first driving current, the proximity sensor uses the first gain value to process the optical sensing signal, when the driving current is the second driving current, the proximity sensor uses the second gain value to process the optical sensing signal.

3. The proximity sensor operating method of claim 2, wherein the second driving current is P times the first driving current, and the first gain value is Q times the second gain value, P>1 and Q>1.

4. The proximity sensor operating method of claim 1, further comprising:
   in the check mode, if the proximity sensor is no longer triggered before the length of time or number of times of triggering the proximity sensor is larger than or equal to the threshold length or number, the output of the proximity sensor is maintained at the first sensing state, and returning to the standby mode such that the driving current comprises the first driving current.

5. The proximity sensor operating method of claim 1, wherein the first sensing state is a near state and the second sensing state is a far state;
   wherein the proximity sensor is triggered if the proximity sensor determines a value of the optical sensing signal is smaller than a first sensing threshold value.

6. The proximity sensor operating method of claim 1, wherein the proximity sensor further comprises an optical sensor configured to generate an optical sensing signal according to received light, wherein the first sensing state is a far state and the second sensing state is a near state;
   wherein the proximity sensor is triggered if a value of the optical sensing signal is larger than a second sensing threshold value.

7. The proximity sensor operating method of claim 1, wherein the driving current is the first driving current in the standby mode.

8. The proximity sensor operating method of claim 1, wherein the driving current comprises the first driving current and the second driving current and is periodically the second driving current, in the standby mode.

9. The proximity sensor operating method of claim 8, wherein the driving current is the second driving current once every 0.5~5 seconds.

10. The proximity sensor operating method of claim 8, wherein, in the standby mode, the proximity sensor is triggered when the driving current is the second driving current, and the proximity sensor is not triggered when the driving current is the first driving current.

11. The proximity sensor operating method of claim 1, wherein the driving current is the second driving current in the check mode.

12. The proximity sensor operating method of claim 1, wherein the driving current is alternately the first driving current and the second driving current in the check mode.

13. The proximity sensor operating method of claim 1,
   wherein the proximity sensor further comprises an optical sensor configured to generate an optical sensing signal according to received light, wherein the first sensing state is one of a near state and a far state, and the second sensing state is the other one of the near state and the far state;
   wherein the proximity sensor is triggered when an output of the proximity sensor is the near state and a value of the optical sensing signal is smaller than a first sensing threshold value;
   wherein the proximity sensor is triggered when the output of the proximity sensor is the far state and the value of the optical sensing signal is larger than a second sensing threshold value.

14. The proximity sensor operating method of claim 13, wherein the first sensing threshold value is smaller than or equal to the second sensing threshold value.

15. The proximity sensor operating method of claim 1,
   wherein the proximity sensor further comprises an optical sensor configured to generate an optical sensing signal according to received light, wherein the first sensing state is one of a near state and a far state, and the second sensing state is the other one of the near state and the far state;
   wherein the proximity sensor is triggered when the driving current is the first driving current, an output of the proximity sensor is the near state and a value of the optical sensing signal is smaller than a first sensing threshold value;
   wherein the proximity sensor is triggered when the driving current is the first driving current, the output of the proximity sensor is the far state and the value of the optical sensing signal is larger than a second sensing threshold value;
   wherein the proximity sensor is triggered when the driving current is the second driving current, the output of the proximity sensor is the near state and a value of the optical sensing signal is smaller than a third sensing threshold value;
   wherein the proximity sensor is triggered when the driving current is the second driving current, the output of the proximity sensor is the far state and the value of the optical sensing signal is larger than a fourth sensing threshold value.

16. The proximity sensor operating method of claim 15, wherein the first sensing threshold value is smaller than or equal to the second sensing threshold value, the third sensing threshold value is smaller than or equal to the fourth sensing threshold value.

17. The proximity sensor operating method of claim 15, wherein the first sensing threshold value is larger than or equal to the third sensing threshold value, the second sensing threshold value is smaller than or equal to the fourth sensing threshold value.

18. A proximity sensor, configured to perform the proximity sensor operating method of claim 1, comprising:
- a light-emitting device, configured to receive at least one driving current to emit light;
- an optical sensor, configured to receive light to generate an optical sensing signal.

\* \* \* \* \*